United States Patent

Soufiane et al.

(10) Patent No.: US 6,807,350 B2
(45) Date of Patent: Oct. 19, 2004

(54) OPTICAL FIBER WITH A RADIALLY VARYING INDEX OF REFRACTION AND RELATED METHODS

(75) Inventors: Abdelouahed Soufiane, Boston, MA (US); Musa Awaleh, Holden, MA (US); John MacDonald, Southbridge, MA (US); Paula Fournier, Springfield, MA (US)

(73) Assignee: Verrillon, Inc., North Grafton, MA (US)

( * ) Notice: Subject to any disclaimer, the term of this patent is extended or adjusted under 35 U.S.C. 154(b) by 70 days.

(21) Appl. No.: 10/146,672

(22) Filed: May 15, 2002

(65) Prior Publication Data

US 2003/0016927 A1 Jan. 23, 2003

Related U.S. Application Data

(60) Provisional application No. 60/305,916, filed on Jul. 17, 2001.

(51) Int. Cl.[7] .................................................. G02B 6/22
(52) U.S. Cl. ...................................................... 385/127
(58) Field of Search .................................. 385/126–128

(56) References Cited

U.S. PATENT DOCUMENTS

| | | | |
|---|---|---|---|
| 3,403,955 A | 10/1968 | Jueneman | 350/96 |
| 3,434,774 A | 3/1969 | Miller | 350/96 |
| 3,718,383 A | 2/1973 | Moore | 350/175 GN |
| 3,778,132 A | 12/1973 | Pinnow et al. | 350/96 WG |
| 4,053,204 A | 10/1977 | Miller | 350/96 GN |
| 4,053,205 A | 10/1977 | Miller | 350/96 GN |
| 4,076,380 A | 2/1978 | DiMarcello et al. | 350/96.31 |
| 4,106,850 A | 8/1978 | Marcatili | 350/96.31 |
| 4,111,525 A | 9/1978 | Kaminow et al. | 350/96.31 |
| 4,114,980 A | 9/1978 | Asam et al. | 350/96.33 |
| 4,152,044 A | 5/1979 | Liu | 350/96.12 |
| 4,203,743 A | 5/1980 | Suganuma et al. | 65/3 |
| 4,212,660 A | 7/1980 | Maurer | 65/3 |
| 4,440,558 A | 4/1984 | Nath et al. | 65/3.12 |
| 4,812,153 A | 3/1989 | Andrejco et al. | 65/3.12 |
| 4,968,339 A | 11/1990 | Miller et al. | 65/3.12 |
| 5,044,724 A | * 9/1991 | Glodis et al. | 385/127 |
| 5,175,785 A | 12/1992 | Dabby | 385/123 |
| 5,217,516 A | 6/1993 | Ishiguro et al. | 65/3.11 |
| 5,364,429 A | 11/1994 | Le Sergent | 65/399 |
| 5,676,725 A | 10/1997 | Ito et al. | 65/382 |
| 5,746,797 A | 5/1998 | Noda | 65/17.2 |
| 5,761,366 A | 6/1998 | Oh et al. | 385/127 |
| 5,933,743 A | 8/1999 | New et al. | 438/401 |
| 6,062,046 A | 5/2000 | Terasawa et al. | 65/412 |
| 6,145,344 A | 11/2000 | Oyamada et al. | 65/414 |
| 6,157,758 A | 12/2000 | Abe et al. | 385/37 |
| 6,445,855 B1 | * 9/2002 | Stowe et al. | 385/43 |
| 6,597,849 B2 | * 7/2003 | Ishikawa et al. | 385/127 |
| 6,603,913 B1 | * 8/2003 | Okuno | 385/127 |

FOREIGN PATENT DOCUMENTS

| | | |
|---|---|---|
| WO | WO 98/29768 | 7/1998 |
| WO | WO 00/00860 | 1/2000 |
| WO | WO 00/73822 | 12/2000 |

OTHER PUBLICATIONS

Patent Cooperation Treaty, International Search Report, International Application No. PCT/US02/15409, mailed on Nov. 21, 2002, 8 pages.

* cited by examiner

Primary Examiner—Akm Enayet Ullah
Assistant Examiner—Jerry T Rahll
(74) Attorney, Agent, or Firm—Testa, Hurwitz & Thibeault, LLP

(57) ABSTRACT

An optical fiber has a core with a diameter $d_c$ and a reflective index $n_c$; a primary cladding concentrically surrounding the core and having an outer diameter $d_{pc}$ and a refractive index $n_{pc}$ less than the core refractive index $n_c$; and a secondary cladding concentrically surrounding the primary cladding and having an outer diameter $d_{sc}$ and a refractive index $n_{sc}$ less than the primary cladding refractive index $n_{pc}$.

14 Claims, 3 Drawing Sheets

OPTICAL FIBER WITH A RADIALLY VARYING INDEX OF REFRACTION AND RELATED METHODS

CROSS-REFERENCE TO RELATED APPLICATIONS

This application claims priority to and the benefits of U.S. Provisional Patent Application Ser. No. 60/305,916 filed on Jul. 17, 2001, the entire disclosure of which is herein incorporated by reference.

FIELD OF THE INVENTION

The invention relates generally to optical fibers and more specifically to optical fibers with a controlled refractive index profile.

BACKGROUND OF THE INVENTION

Beam splitters and combiners are widely used today in optical communications systems. Optical splitters divide a single light beam into a plurality of light beams. Conversely, combiners take a plurality of light beams and combine them into a fewer number of beams (e.g. eight to one). Combiners and splitters generally introduce two losses into the overall system performance, "insertion loss" and "excess loss." Insertion loss is the loss in a transmission line that results from inserting (i.e., introducing) the component in the transmission line (e.g., a 3 dB 2×2 coupler inserted into a line will introduce a 50% or 3 dB loss in the line). Excess loss is the internal loss attributable to the specific component itself.

Excess loss arises, for example, from fiber fusion and/or tapering of the fiber, and is generally related to the number of splits or combinations of fibers made in the component. (Fusion refers to localized heating and softening of two or more fibers to attach them together; tapering relates to reduction in the size of the fiber geometry, e.g., as a result of fusion or polishing.) For example, an 8-to-1 splitter will generally have a higher excess loss than a 4-to-1 splitter designed for the same operation band, with the same fibers. Fibers can be joined by means of cladding-fused and cladding-polished couplers.

With reference to FIG. 1, a typical single mode optical fiber 100 used to create either a cladding-polished or cladding-fused coupler includes a core 110 and a cladding 120. In a cladding-fused coupler, shown in FIG. 2, the claddings of two single mode fibers 100a, 100b are fused together, thereby fixing cores 110a, 110b in close proximity to each other at the region of joinder. Cross-talk between cores 110a, 100b results in transfer of a portion of the signal propagating through one of the cores to the other core. In cladding-polished couplers, the core 110 of each fiber is polished flat and mechanically aligned to the other core 110, thereby inducing cross-talk between the cores.

The coupling efficiency of both cladding-fused and cladding-polished couplers is reduced because a portion of the signal propagating in the core is transferred to cladding 120 at the point of coupling, thereby increasing the excess loss of the device incorporating the coupled fibers.

Accordingly, there exists a need for an optical fiber with reduced or minimal excess loss resulting from coupling.

SUMMARY OF THE INVENTION

The present invention is directed to improving the coupling efficiency of both cladding-fused and cladding-polished optical couplers thereby reducing excess loss.

One aspect of the invention is directed to an optical fiber including a core having a diameter $d_c$ and a refractive index $n_c$, a primary cladding concentrically surrounding the core and having an outer diameter $d_{pc}$, and a refractive index $n_{pc}$ that is less than the core refractive index $n_c$ and a secondary cladding concentrically surrounding the primary cladding. The secondary cladding has an outer diameter $d_{sc}$ and a refractive index $n_{sc}$ that is less than the primary cladding refractive index $n_{pc}$. The primary cladding outer diameter $d_{pc}$ is a fraction of the secondary cladding outer diameter $d_{sc}$. The difference between the primary cladding refractive index $n_{pc}$ and the secondary cladding refractive index $n_{sc}$ is greater than or equal to a constant and less than or equal to the core refractive index $n_c$ less the constant.

In other embodiments, the primary cladding is updoped or the secondary cladding is downdoped. The primary cladding outer diameter is a fraction of the secondary cladding outer diameter. The fraction may range from >0% to 75%; is desirably 10% to 50%; and is most preferably around 20%. The above-mentioned constant relating the refractive indices of the primary and secondary claddings is preferably equal to or greater than 0.0002.

In another embodiment, the cladding and/or the core includes a material inducing photosensitivity, such that exposure to radiation creates a refractive-index modulation within the cladding and/or the core.

In another aspect, the invention is directed to a method of coupling a pair of optical fibers. The method includes the steps of providing a pair of fibers and fusing the fibers along a portion of their longitudinal extents to couple them.

The primary claddings may or may not be fused. Thus, in some embodiments, the primary claddings are fused, while in other embodiments, the primary claddings are not fused but the secondary claddings are fused proximate to the primary claddings.

BRIEF DESCRIPTION OF THE DRAWINGS

The invention is pointed out with particularity in the appended claims. The advantages of the invention may be better understood by referring to the following description taken in conjunction with the accompanying drawing in which:

DETAILED DESCRIPTION OF THE INVENTION

Figure 1:
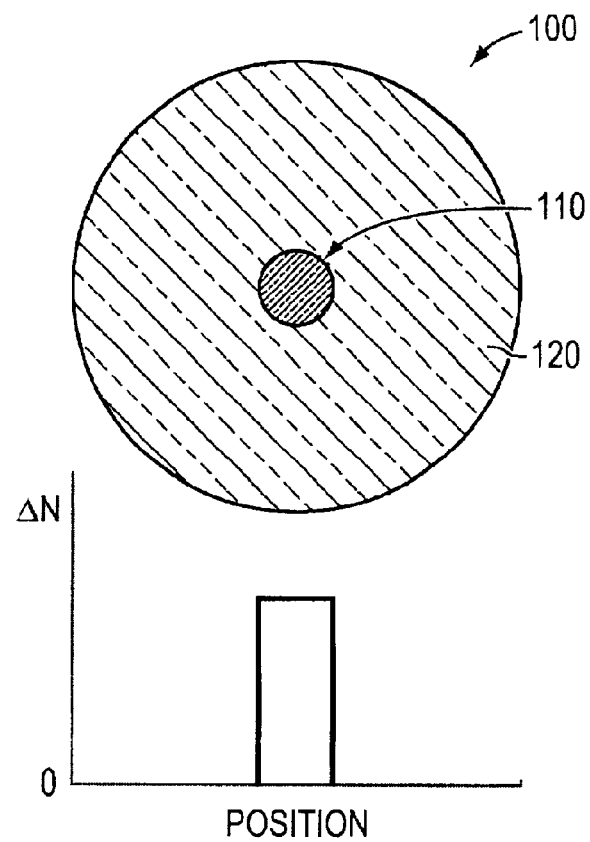
FIG. 1 is an end view of a prior art single mode optical fiber and a graph showing the radial variation of the fiber's refractive index.
Figure 2:
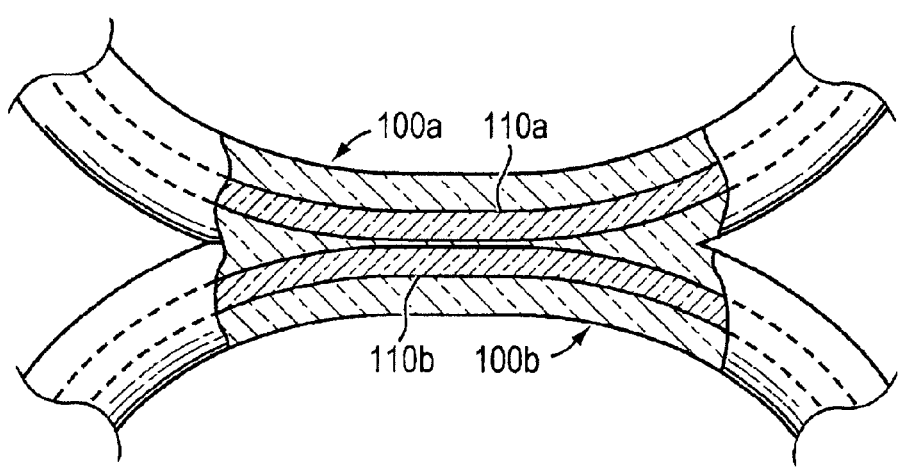
FIG. 2 is a plan view of a prior art cladding fused optical coupler.
Figure 3:
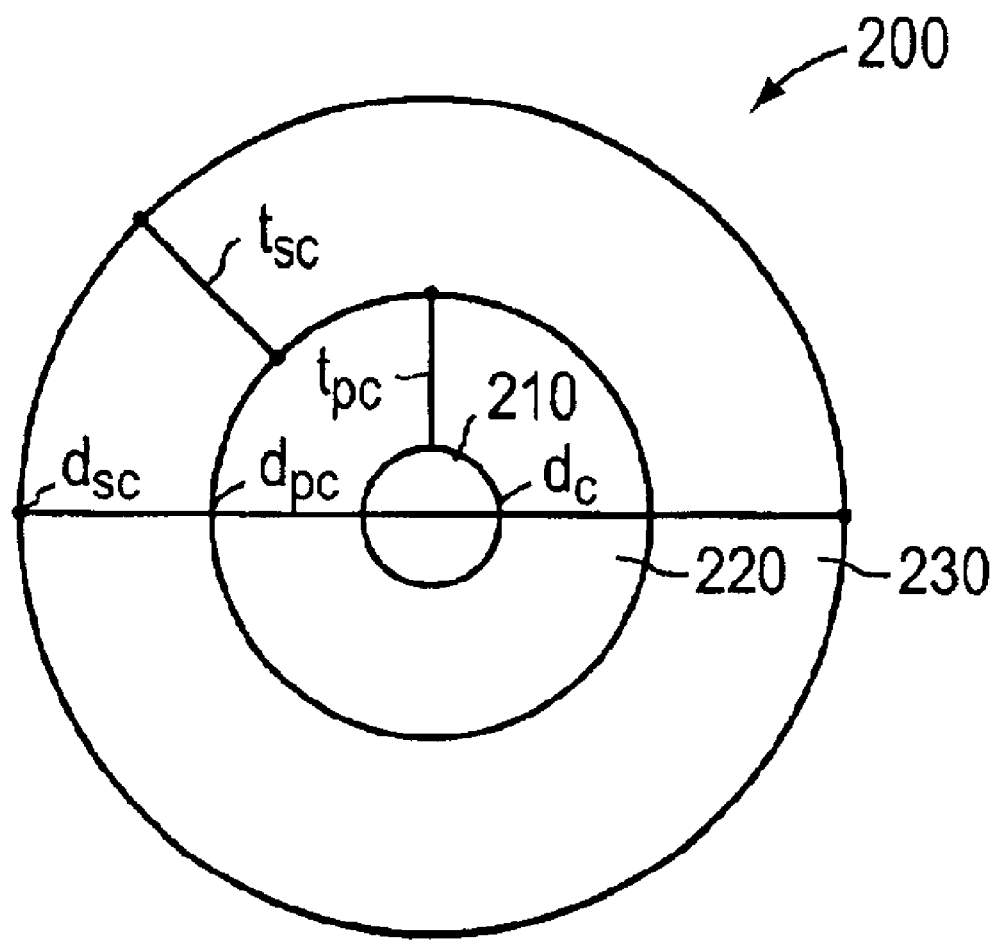
FIG. 3 is an end view of an embodiment of the present invention.

With reference to FIG. 3, one embodiment of the present invention, indicated generally at 200, includes a core 210 having an outer diameter $d_c$ and a refractive index $n_c$, a primary cladding 220, which concentrically surrounds core 210, having an outer diameter $d_{pc}$, an annular thickness $t_{pc}$ that is substantially equal to $(d_{pc}-d_c)/2$, and a refractive index $n_{pc}$; and a secondary cladding 230, which concentrically surrounds primary cladding 220, having an outer diameter $d_{sc}$, an annular thickness $t_{sc}$ that is substantially equal to $(d_{sc}-d_{pc})/2$, and a refractive index $n_{sc}$. The relationship among the refractive indices mentioned above is $n_c > n_{pc} > n_{sc}$. Thicknesses $t_{pc}$ and $t_{sc}$ are related in that $t_{pc} \leq t_{sc}$. In one embodiment, annular thickness $t_{sc}$ is substantially 125 $\mu$m. In another embodiment, annular thickness $t_{sc}$ is substantially 80 $\mu$m.

Both primary cladding 220 and secondary cladding 230 are typically composed of silica-based glass material. Primary cladding 220 is selected or treated to slightly elevate the refractive index $n_{pc}$; for example, one of the primary or secondary claddings may be pure silica and the other doped such that primary cladding 220 exhibits a slightly higher index (that is, primary cladding 220 may be pure silica and secondary cladding 230 "downdoped" to lower its index, or secondary cladding 230 may be pure silica and primary cladding 220 "updoped" to raise its index); or both the primary and secondary claddings may be doped, with primary cladding 220 doped as appropriate to achieve the desired index elevation. As used herein, the term "downdope" refers to the addition of one or more dopants that lower the refractive index or to the use of a dopant concentration or combination which, relative to an adjacent layer, achieves a lower index than that layer (e.g., through use of a lower concentration of an index-raising dopant, or a higher concentration of an index-decreasing dopant); similarly, the term "updope" refers to the addition of one or more dopants that raise the refractive index or to the use of a dopant concentration or combination which, relative to an adjacent layer, achieves a higher index than that layer. Typical index-raising dopants include, for example, germanium, phosphorus, titanium and aluminum, while fluorine and boron are common index-lowering dopants. The dopants are added during the manufacturing process, for example, the modified chemical vapor deposition process (MCVD) or another process such as, but not limited to, outside vapor deposition (OVD), vapor axial deposition (VAD), and plasma vapor deposition (PVD).

Figure 4:
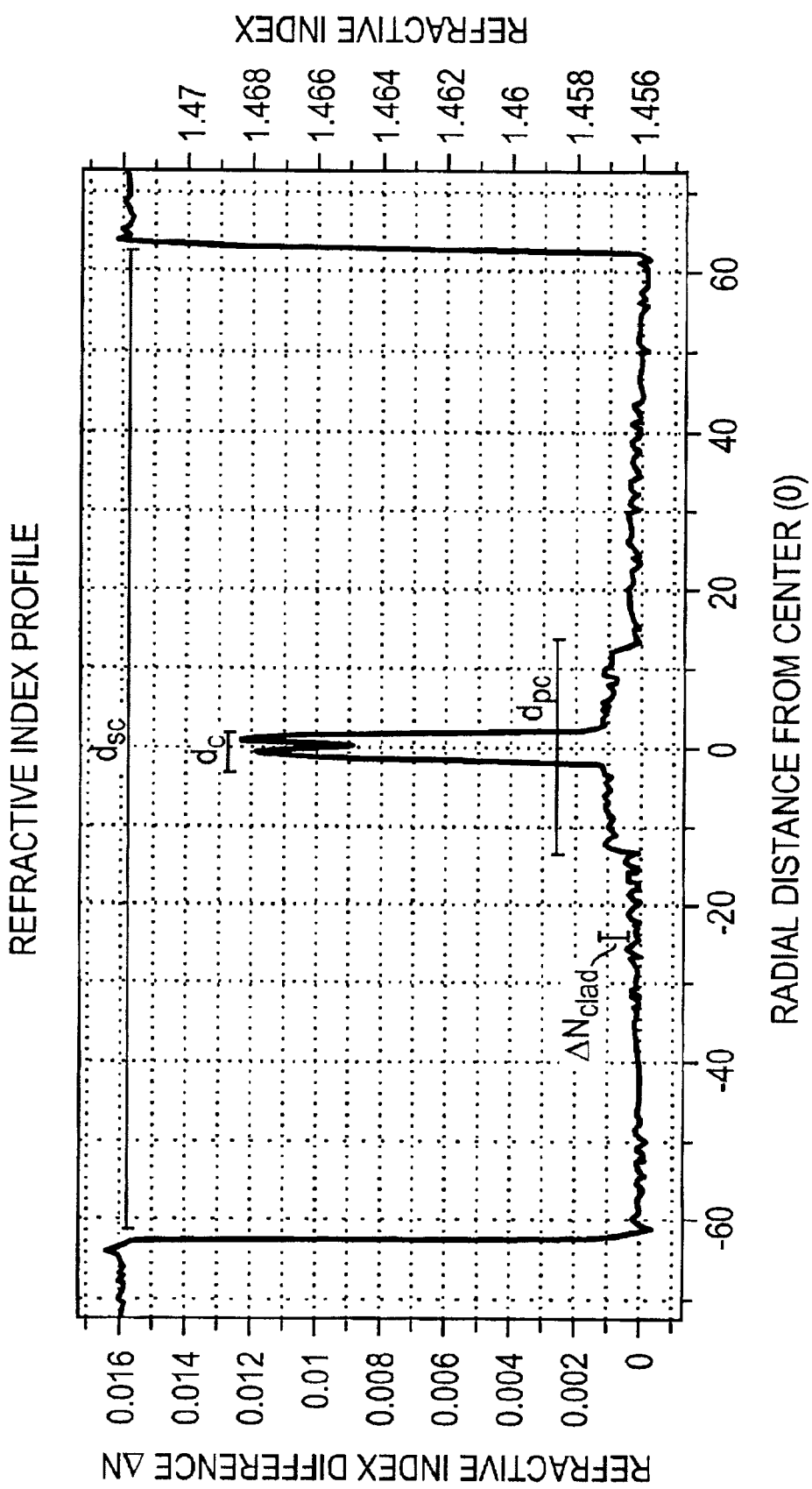
FIG. 4 graphically depicts the refractive index profile of an optical fiber in accordance with the principles of the present invention.

FIG. 4 depicts the refractive index profile and the differences among the refractive indices of an embodiment of the present invention. Core refractive index $n_c$ is the largest, and generally constant until outer core diameter $d_c$ is reached. Primary cladding 220 begins where core 210 ends, thus the refractive index transitions to that of primary cladding 220 (i.e., $n_{pc}$). Primary cladding refractive index $n_{pc}$ is less than that of core 210. Again, the primary cladding refractive index $n_{pc}$ is substantially constant until primary cladding outer diameter $d_{pc}$ is reached. Secondary cladding refractive index $n_{sc}$ is slightly less than primary cladding refractive index $n_{pc}$ and remains substantially constant until the secondary cladding outer diameter $d_{sc}$ is reached. The difference between primary cladding refractive index $n_{pc}$ and secondary cladding refractive index $n_{sc}$ is indicated in FIG. 4 by $\Delta n_{clad}$. The quantity $\Delta n_{clad}$ generally remains in a range between a constant and the core refractive index $n_c$ less the constant (i.e., $k \leq \Delta n_{clad} \leq n_c - k$). In one embodiment, $k \geq 0.0002$. The quantity $\Delta n_{clad}$ is determined before fabrication and may be selected to provide the desired performance for a given wavelength of light and coupling application. In use, two fibers are coupled so that the primary claddings fuse; alternatively, the fibers may be coupled so that only the secondary claddings fuse, but the primary claddings are in close proximity. The two fibers may be constructed in accordance with the principles of the present invention, or a fiber of the present invention may be fused with a traditional or other custom fiber. Additionally, principles of the present invention can be embodied in other fused devices, such as, splitters, combiners, add-drop filters, and mulitplexers.

Generally, the dimension of the primary cladding outer diameter $d_{pc}$ is a fraction of the secondary cladding outer diameter $d_{sc}$. The fraction $d_{pc}/d_{sc}$ may range from >0 to 0.75; is desirably 0.1 to 0.5; and is most preferably around 0.2 (i.e., $d_{pc} \approx 0.2 d_{sc}$). The dimensions of primary cladding outer diameter $d_{pc}$ and secondary cladding outer diameter $d_{sc}$ are also determined prior to fabrication and are selected to provide the desired performance for a given wavelength of light and coupling application.

Therefore, by controlling the dimensions of outer diameters $d_{pc}$ and $d_{sc}$, and the difference $\Delta n_{clad}$, the present invention provides improved coupling efficiency.

It should be noted that the core and/or cladding layers may be made photosensitive to facilitate production of fiber Bragg gratings. These devices, which are used to filter, reflect and/or demultiplex wavelength-division multiplexed signals, are implemented within the fiber itself by providing a refractive-index modulation within the core. Fiber Bragg gratings may be obtained by, for example, rendering the core photosensitive to a certain form of radiation (typically ultraviolet light) and then exposing the fiber to such radiation, thereby altering the refractive index of the core where so exposed. Photosensitivity may be achieved, e.g., by doping a silica core with germanium and/or boron. Creating the pattern of index variations characteristic of a fiber Bragg grating may be achieved using any of various techniques, including holographic approaches, exposure of the fiber to radiation through a phase mask, etc.

The present invention is amenable to this treatment; that is, photosensitivity may be imparted to a fiber produced in accordance herewith so long as the necessary refractive-index relationships are maintained.

Having shown the preferred embodiments, one skilled in the art will realize that many variations are possible within the scope and spirit of the claimed invention. It is therefore the intention to limit the invention only by the scope of the claims.

What is claimed is:

1. An optical fiber comprising:
  a core having a diameter $d_c$ and a refractive index $n_c$;
  a primary cladding concentrically surrounding the core and having an outer diameter $d_{pc}$ and a refractive index $n_{pc}$ less than the core refractive index $n_c$, wherein the refractive index $n_{pc}$ is substantially constant through the primary cladding; and
  a secondary cladding concentrically surrounding the primary cladding and having an outer diameter $d_{sc}$ and a refractive index $n_{sc}$ less than the primary cladding refractive index $n_{pc}$, wherein the primary cladding outer diameter $d_{pc}$ is a fraction of the secondary cladding outer diameter $d_{sc}$, and wherein a difference between the primary cladding refractive index $n_{pc}$ and the secondary cladding refractive index $n_{sc}$ is greater than or equal to a constant and less than or equal to the core refractive index $n_c$ less the constant.

2. The optical fiber of claim 1, wherein the primary cladding is updoped.

3. The optical fiber of claim 1, wherein the secondary cladding is downdoped.

4. The optical fiber of claim 1, wherein the fraction ranges from >0 to 0.75.

5. The optical fiber of claim 4, wherein the fraction ranges from 0.1 to 0.5.

6. The optical fiber of claim 4, wherein the fraction is about 0.2.

7. The optical fiber of claim 1, wherein the constant is about 0.0002.

8. The fiber of claim 1, wherein the core further comprises a material rendering the core photosensitive, such that exposure of the core to radiation creates a refractive-index modulation within the core.

9. The fiber of claim 1, wherein at least one of the primary and secondary cladding further comprises a material causing photosensitivity, such that exposure of the at least one cladding to radiation creates a refractive-index modulation therein.

10. The fiber of claim 1, wherein the secondary cladding has an annular thickness $t_{sc}$ of substantially 125 μm.

11. The fiber of claim 1, wherein the secondary cladding has an annular thickness $t_{sc}$ of substantially 80 μm.

12. A method of coupling a pair of optical fibers, comprising the steps of:

providing a pair of fibers, each of the fibers having a longitudinal extent and at least one of the fibers comprising (i) a core having a diameter $d_c$ and a refractive index $n_c$; (ii) a primary cladding concentrically surrounding the core and having an outer diameter $d_{pc}$ and a refractive index $n_{pc}$ less than the core refractive index $n_c$; and (iii) a secondary cladding concentrically surrounding the primary cladding and having an outer diameter $d_{sc}$ and a refractive index $n_{sc}$ less than the primary cladding refractive index $n_{pc}$ wherein the primary cladding outer diameter $d_{pc}$ is a fraction of the secondary cladding outer diameter $d_{sc}$, and wherein a difference between the primary cladding refractive index $n_{pc}$ and the secondary cladding refractive index $n_{sc}$ is greater than or equal to a constant and less than or equal to the core refractive index $n_c$ less the constant; and fusing the fibers along a portion of their longitudinal extents to couple them.

13. The method of claim 12 wherein the primary claddings are fused.

14. The method of claim 12 wherein the primary claddings are not fused but the secondary claddings are fused proximate to the primary claddings.

* * * * *